Aug. 18, 1953   R. MOREL   2,649,566
POLARITY REVERSAL DEVICE FOR ELECTROSTATIC MACHINES
Filed Jan. 31, 1951   2 Sheets-Sheet 1
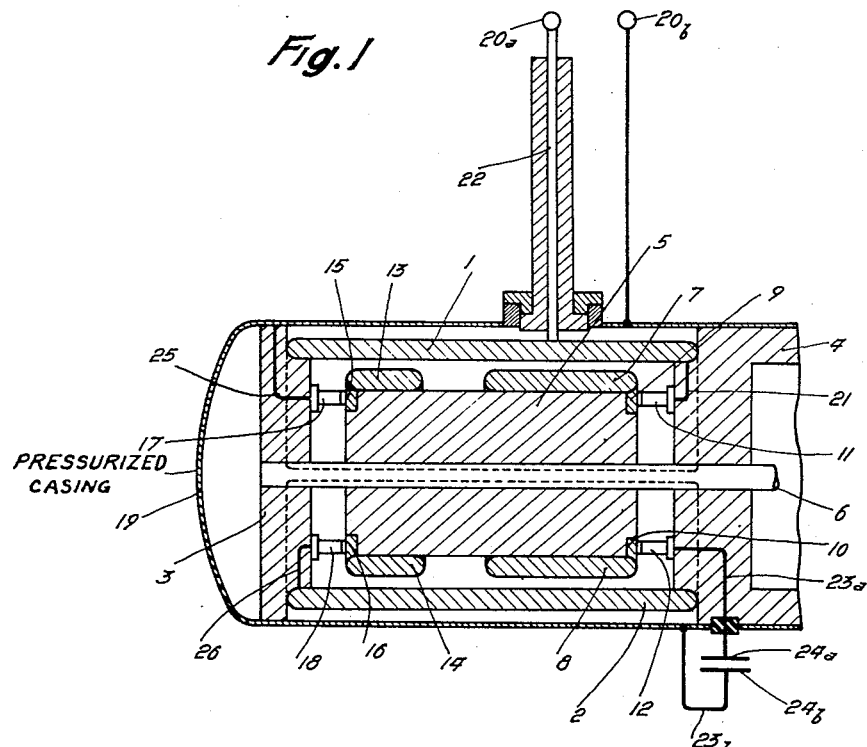
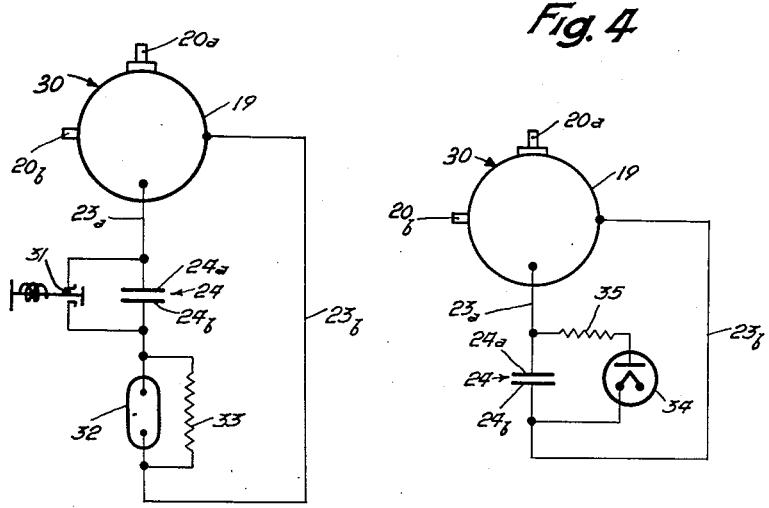
INVENTOR
Roger Morel
By George Morey
ATTORNEY

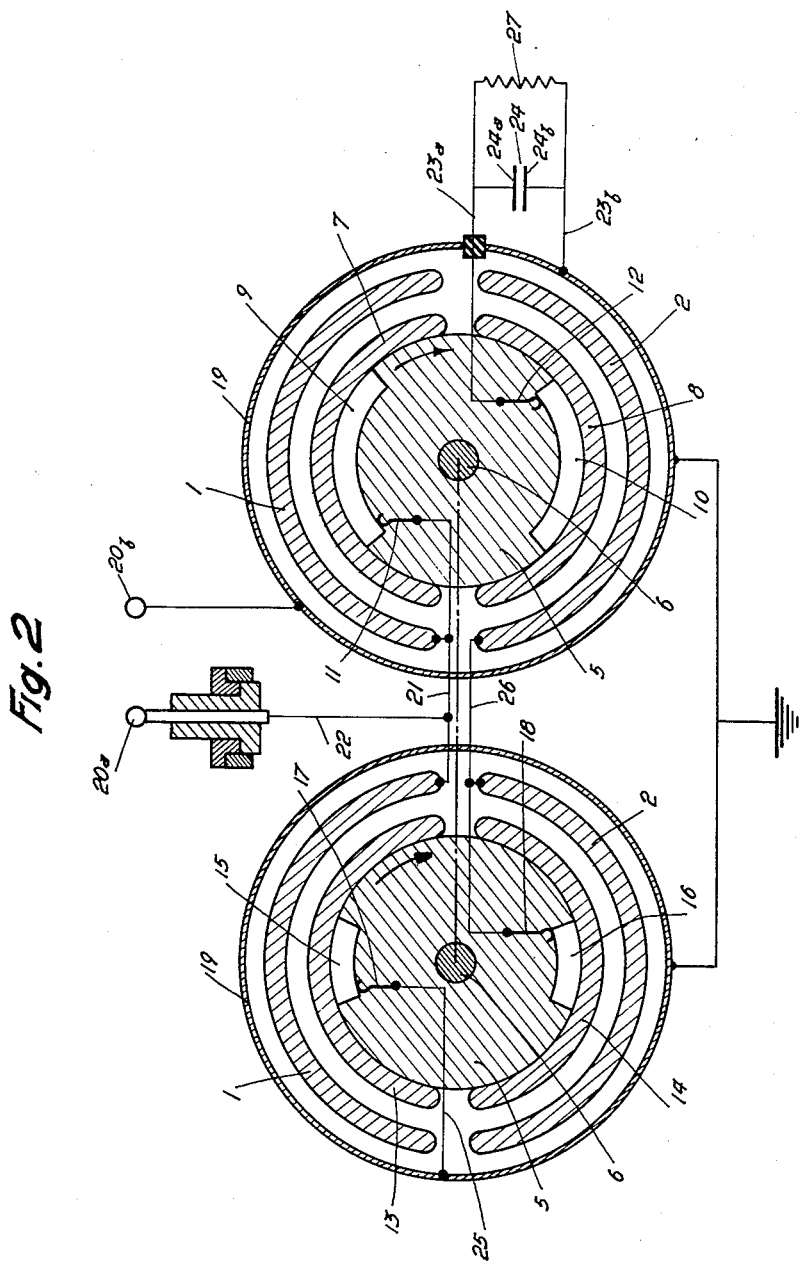

Patented Aug. 18, 1953

2,649,566

UNITED STATES PATENT OFFICE 2,649,566

POLARITY REVERSAL DEVICE FOR ELECTROSTATIC MACHINES

Roger Morel, Grenoble, France, assignor to Societe Anonyme des Machines Electrostatiques, Grenoble, France, and Centre National de la Recherche Scientifique, Paris, France, each a corporation of France Application January 31, 1951, Serial No. 208,790
In France February 7, 1950

19 Claims. (Cl. 322—2)

The present invention relates to electrostatic induction generating machines with conducting conveyor members and provided with an exciter and, more particularly, to a device applicable to such machines for controlling their polarity.

It is known that machines of this type are energized, on starting, under the effect of the residual charges carried by the inductor member and that when being so energized they may indeterminately adopt one polarity or the other if no particular care is taken and that this polarity, once adopted, normally remains the same until a long lasting rest is given to the machine.

The present invention has for its object a device providing for periodically reversing the polarity of such a machine and which also provides for fixing this polarity in the desired direction either at will or automatically during normal operation.

The device according to the invention comprises a condenser inserted in an electric circuit which normally carries current in a given direction and preferably a circuit through the contact charge brush of the generating machine or of the exciter, the capacity of this condenser being higher than the maximum capacity which may exist between the corresponding inductor and conveyor members of the machine. The so-called contact charge brush is the brush which is connected to a given conveyor member when this conveyor member faces the main inductor member of its machine.

Owing to this arrangement, when the machine is put into operation and adopts any polarity, the difference of potential across the terminals of the condenser increases gradually whilst the charge delivered to the condenser by the given conveyor member of the machine during successive cycles decreases gradually. When this difference of potential reaches a certain value, the condenser is discharged while developing on the conveyor member a charge of contrary sign to that which it conveyed originally. The action then takes place with such reversed polarity until the condenser again is discharged, thus giving rise to periodical polarity reversals.

Devices may be provided in connection with the condenser circuit in order to switch the condenser on and off at will or automatically for limiting its action to a single polarity change or a limited number of such changes in order to determine the polarity of the machine in a predetermined direction notwithstanding the polarity which the machine had originally adopted.

The invention will be described more fully hereinafter by way of example with reference to the accompanying drawings in its application to a cylindrical electrostatic machine with two rotors.

In the drawings:

Fig. 1 is a diagram of a partial longitudinal section through the machine of the invention;

Fig. 2 is a diagram showing, side by side, both cross sectional views of the rotors of the machine according to Fig. 1 and showing the electric connections;

Fig. 3 is a wiring diagram in accordance with the invention providing for fixing, at will, the polarity of an electrostatic generating machine;

Fig. 4 is a modification of Fig. 3 providing for automatically fixing the polarity.

The machine which is shown diagrammatically in Figs. 1 and 2 comprises two half-cylindrical inductor members 1 and 2 carried by terminal flanges 3 and 4 and extending about two rotors carried by a common core 5 of insulating material fastened upon a rotary shaft 6. One of these rotors is formed of two half-cylindrical conveyor members 7 and 8 arranged on the periphery of core 5 and cooperating with inductor members 1 and 2 in order to form the main generating machine, member 1 playing for this rotor the part of a screen whilst member 2 plays the part of the main inductor member. Conveyors 7 and 8 are connected to contact sectors 9 and 10 respectively carried by core 5 and cooperating with fixed brushes 11 and 12. The second rotor is formed of two half-cylindrical conveyor members 13 and 14 respectively arranged in longitudinal alignment with conveyor members 7 and 8 but having in the direction parallel with the axis of the machine a length less than that of the conveyor members 7, 8, member 1 acting, for this rotor, as an inductor member whilst member 2 forms a screen. The conveyor members 13 and 14 are respectively connected to contact sectors 15 and 16 carried by core 5 and cooperating with fixed brushes 17 and 18, this second rotor forming an auxiliary generating machine for energizing the main generating machine. The whole unit is enclosed in a fluid tight metallic casing 19 inside which a high gas pressure is caused to prevail.

Brush 11 of the main generating machine is connected to one of the terminals 20a of the machine through conductor 21 and conductor 22 and to inductor member 1, these conductors extending in insulated relation to and through casing 19 of the machine. Brush 12 of the main generating machine is connected by a conductor 23a which extends through casing 19 in insulated relation thereto to one of the plates 24a of a condenser 24 the capacity of which is well above the maximum capacity which may be formed between a conveyor member and an inductor member of the main generating machine, the other plate 24b of the condenser being connected through a conductor 23b to casing 19. On the other hand, brush 17 of the exciter is connected through a conductor 25 directly to casing 19 whilst brush 18 is connected to inductor member 2 through a conductor 26.

The second terminal 20b of the machine is connected to casing 19 which forms the grounding of the machine.

The machine so constituted operates as follows:

The rotors are driven in rotation by suitable means through shaft 6 in the direction indicated by the arrows, and the initial position is assumed to be that shown in Fig. 2. It is also assumed that the potential of member 1 is initially negative and equal to −U, that of member 2 being positive and equal to +U.

If, initially, condenser 24 is not charged, conveyor member 8 having become connected to brush 12 picks up negative electricity from the condenser under the influence of inductor member 2. When in the rotation of the shaft 6 and core 5 in the direction of the arrows the contact between sector 10 and brush 12 is broken, the conveyor member 8 carries with it a negative charge and plate 24a of condenser 24 is now at a positive potential with respect to the ground to which its other plate 24b is connected. As the charge carried by the capacity formed by the inductor and conveyor members is equal to that of the condenser 24 in series therewith, the difference of potential across the terminals of the condenser is much smaller than that between conveyor member and inductor member due to the fact that the capacity between these two members is much smaller than that of the condenser. Conveyor member 8 has received, moreover, a charge which is less than in the case where brush 12 is directly connected to the ground, i. e. a charge smaller than −CU, C being the capacity between inductor member and conveyor member.

As the rotor keeps on rotating, contact is established between sector 10 and brush 11 and the charge carried by conveyor member 8 is transferred to the outer circuit through the terminal 20a, this transfer being promoted by the presence of screen 1 connected to the terminal 20a, which screen thereby is brought to the same potential as conveyor member 8 and thus avoids any influence of the ground upon the conveyor member.

During this time the conveyor member 13 of the exciter, having received a positive charge when passing opposite inductor member 1 while connected to the ground, transfers this charge through its sector 15 rotated into contact with brush 18 to member 2 which forms a screen for the exciter and the potential and polarity of inductor 2 thus would be maintained, for stable conditions of operation, for next influencing the conveyor member 7 of the generator now rotated into face to face relation with inductor 2. This conveyor member 7, however, when in the presence of inductor member 2 and with sector 9 in contact with brush 12, receives a charge from plate 24a of the condenser which is less than that which the conveyor member 8 had previously carried away because the condenser prevents passage of negative charge directly to the conveyor from the ground and only a negative charge remaining on the plate 24a may pass to conveyor 7. The difference of potential across the plates of condenser 24, owing to this negative charge which conveyor member 7 then receives and the added positive charge which the condenser receives from conveyor 7, is increased with respect to the difference of potential which previously existed across these condenser plates when the contact was broken between sector 10 and brush 12. Thus, it is not through the difference of potential between inductor member and ground or through the same difference of potential to which the conveyor 8 was subjected that conveyor 7 is charged but through a difference of potential reduced because the potential of the plate 24a of condenser 24 and, therefore, of the conveyor 7 connected thereto have been raised.

As the rotor continues to rotate to bring the contact sector 9 into contact with brush 11, conveyor 7 then transfers its reduced charge through terminal 20a to the outer circuit to which the machine delivers and the operation then is repeated for conveyors 8, 7, 13, 14, the charges that are brought successively by the conveyor members to the outer circuit decreasing progressively. It results therefrom that the voltage across the terminals of the machine gradually decreases. This decrease is promoted since inductor 1 of the exciter is connected to terminal 20a and its potential decreases in a corresponding manner. This results in a progressive reduction of the charge delivered by the exciter to the main inductor 2 and consequently, due to the reduction of potential of inductor member 2, also effects reduction of the charge delivered by the main generating machine to the terminal 20a.

When the delivery of the main generating machine and of its exciter is very near zero a period of time occurs when the condenser 24 begins positively to charge conveyor member 8 and its sector 10 when they are connected with the condenser electrode 24a and thereafter similarly to charge conveyor member 7 and its sector 9. The polarity of inductor member 1 which becomes connected with the conveyors 8 and 7 is reversed as well as the polarity of the charges carried away by conveyor members 13 and 14 of the exciter, which leads to a rapid drop of potential of inductor member 2 and then to change of its sign. Condenser 24 becomes completely discharged and the cycle just described then is repeated but with potentials of opposed signs for all the members of the machine. The condenser is charged again, its plate 24a being then negative, the positive charges then brought by conveyor members 7 and 8 to the outer circuit through terminal 20a decreasing again gradually, the polarity of the machine is again reversed, and the cycle of operation is then repeated as first described for conveyors 8, 7, 13, 14.

It will be understood that periodical polarity reversals may be obtained in a similar manner by inserting a condenser between brush 17 of the exciter and the ground instead of inserting it between the ground and brush 12 of the main generating machine.

The period of polarity reversals is determined, more particularly, through the capacity of the condenser and its insulation, such period being greater the higher the capacity of the condenser and the better its insulation. It thus will be possible to control this period by adjusting, more particularly, the effective capacity and the leakage current by means of a high resistance resistor shunting the condenser, such a resistor being shown in Fig. 2 by reference numeral 27. It is of advantage, moreover, to provide a leak off in any case either by means of a high resistance or, for example, by means of a glow device inserted in the delivery circuit of the machine. It will be clear that the device in accordance with the invention will not reverse the polarity if the resistance of the delivery circuit is too high. Furthermore, it is advisable to provide a voltage limiter, such as a small spark gap or a small lightning arrester with ionized gas connected to the terminals of condenser 24, in order to avoid the condition that the dielectric of the condenser may break down under the action of a discharge following an excessive charge of the electrodes.

A particularly interesting application of the invention is a device providing for fixing at will the polarity on an electrostatic generating machine. It is this application which is shown in Fig. 3. In this figure, 30 designates an electrostatic generating machine of the above described type which combines casing 19, terminals 20a and 20b and conductor 23a connected to brush 12 within the casing, on the one hand, and, on the other hand, to plate 24a of condenser 24. A push button contact 31 biased to closed position is connected across the terminals of condenser 24 and, in its unoperated position, short-circuits this condenser. Plate 24b of the condenser is connected to casing 19 of the machine through conductor 23b in series with a luminescent discharge tube 32 shunted by a high resistor 33. The tube 32 is of the type known per se which comprises two identical electrodes and in which, when an electric current flows therethrough, the electrode operating as cathode is surrounded by a luminous sheath which makes it possible immediately to ascertain the direction in which the current passes.

The operation of the device of Fig. 3 is simple. When the generating machine is put into operation it is energized owing to the residual charges of its inductor members and its polarity which at the first may be in either direction is indicated by the luminescent tube 32. If this polarity corresponds to the desired one no manipulation is necessary. If the polarity is opposite to that desired the push button of contact 31 is depressed to open the switch which normally short-circuits condenser 24. Then the process of polarity reversal such as described above with reference to Figs. 1 and 2 starts. As this process takes place it will be found that the luminous sheath which surrounds the electrode operating as cathode is gradually restricted and the machine becomes deenergized. Then the sheath shows on the other electrode of the tube 32 which indicates that the machine has been reenergized in the other direction. The luminous sheath passes, therefore, from one electrode of the tube 32 to the other. After it is completely extinguished on the first electrode and then has reached its maximum brilliancy on the other electrode the button controlling contact 31 is released and condenser 24 is short-circuited again and the polarity remains fixed until disturbed by some condition occurring in the operation.

When the polarity of the machine is to be fixed in a predetermined direction an arrangement may be used which automatically performs the operation which has just been described. Such an arrangement is shown in Fig. 4 in which again is shown a machine 30 with the same members as those which are shown in Fig. 3. In this embodiment condenser 24 is shunted by a diode 34 the anode and the cathode of which are connected in such a manner that the current flows through the diode in the direction corresponding to the desired polarity. In the embodiment shown, the arrangement assumed is that which gives rise to a negative potential for terminal 20a as in Fig. 2, the plate 24a then being at a positive potential. If the machine, when starting, is energized in the desired direction the current flows through the diode 34 to the plate 24b and the terminal 20b connected thereto and condenser 24 which is thus short-circuited is without effect. If, on the other hand, the machine is energized in an opposite direction, i. e. in the direction which tends to confer a positive potential to terminal 20a, diode 34 prevents flow of the current therethrough in the direction from conductor 23b to conductor 23a, condenser 24 is charged progressively and a cycle of polarity reversal as above described takes place at the end of which the desired polarity is obtained. The diode becomes then conductive and the short-circuited condenser ceases to be effective for reversal and the polarity becomes fixed. It is of advantage to arrange a resistor 35 in series with the diode of Fig. 4 so as to avoid an undue discharge of the condenser which would bring about the destruction of the diode.

Instead of the diode which has been described by way of example it is possible to use any other device capable of preventing the passage of a current in one direction under the maximum voltage which may exist at the terminals of the condenser but, on the contrary, allowing current to pass in the other direction.

What I claim is:

1. Electrostatic apparatus comprising an electrostatic generator having a conductive inductor member and a conductive conveyor member, said members being supported for movement one relative to the other into and out of inductive relation to each other, a terminal of said electrostatic generator, means cooperating with said members and connected to said terminal for conducting to said terminal an electrostatic charge induced upon said conveyor member by said inductor member in said relative movement of said conductive members, an exciter adapted to produce an exciting electrostatic charge and connected to said inductor member to deliver said exciting electrostatic charge thereto initially to determine a given polarity of the charge delivered to said terminal, a condenser having a capacity which is greater than the maximum capacity which may exist between said inductor member and said conveyor member of said electrostatic generator, and means effective concomitantly with said movement of said inductor and conveyor members relative to each other for connecting said condenser in a circuit of said electrostatic apparatus which without said condenser therein connects said conveyor member to a member normally of predetermined polarity and which normally carries charges in a given direction with respect to said conveyor member when said inductor is charged to determine said given polarity, whereby said condenser is effective to exchange charges with said conveyor so as to reverse the polarity of said generator relative to said predetermined polarity.

2. Electrostatic apparatus comprising an electrostatic generator having a conductive inductor member and a conductive conveyor member, said members being supported for movement one relative to the other into and out of inductive relation to each other, a terminal of said electrostatic generator, means cooperating with said members and connected to said terminal for conducting to said terminal an electrostatic charge induced upon said conveyor member by said inductor member in said relative movement of said conductive members, an exciter adapted to produce an exciting electrostatic charge and connected to said inductor member to deliver said exciting electrostatic charge thereto initially to determine a given polarity of the charge delivered to said terminal, a condenser having a capacity which it greater than the maximum capacity which may exist between said inductor member and said conveyor member of said electrostatic generator, a second terminal of said electrostatic generator, and means effective concomitantly with said movement of said inductor and conveyor members relative to each other for connecting said conveyor member in a circuit of said electrostatic apparatus connected to said second terminal, said circuit including said condenser and without said condenser normally carrying charges in a given direction with respect to said conveyor member when said inductor is charged to determine said given polarity, said condenser and said conveyor member being connected in said circuit for exchange therebetween of charges to cause reversal of said polarity of said generator across said terminals.

3. Electrostatic apparatus comprising an electrostatic generator having a conductive inductor member and a conductive conveyor member, said members being supported for movement one relative to the other into and out of inductive relation to each other, a terminal of said electrostatic generator, means cooperating with said members and connected to said terminal for conducting to said terminal an electrostatic charge induced upon said conveyor member by said inductor member in said relative movement of said conductive members, an exciter adapted to produce an exciting electrostatic charge and connected to said inductor member to deliver said exciting electrostatic charge thereto initially to determine a given polarity of the charge delivered to said terminal, a condenser having a capacity which is greater than the maximum capacity which may exist between said inductor member and said conveyor member of said electrostatic generator, a contact brush adapted to make connection with said conveyor member and to connect said conveyor member in a circuit of said electrostatic generator connected to a member of said apparatus normally having a predetermined polarity as said conveyor member and said inductor member substantially begin to move into face to face inductive relation to each other and to break connection substantially as said conveyor and inductor member begin to move out of full face to face inductive relation to each other, said circuit including said condenser and without said condenser normally carrying charges in a given direction when said inductor member is charged by said exciter to determine said given polarity, said condenser being connected in said circuit for exchange of charges between said conveyor member and said condenser as said conveyor member becomes connected in said circuit so as to vary said charge carried by said conveyor member and to cause reversal relative to said predetermined polarity of the polarity of the charge carried by said conveyor member and the polarity of the terminal to which said charge carried thereby is conducted.

4. Electrostatic apparatus comprising an electrostatic generator having a conductive inductor member and a conductive conveyor member, said members being supported for movement one relative to the other into and out of inductive relation to each other, a pair of terminals of said electrostatic generator, means cooperating with said members and connected to a given terminal of said generator for carrying to said given terminal an electrostatic charge induced upon said conveyor member by said inductor member in said relative movement of said conductive members, an exciter having a conductive inductor member and a conductive conveyor member, said exciter members being supported for movement one relative to the other into and out of inductive relation to each other, means cooperating with said exciter members and connected to said inductor member of said generator for carrying to said generator inductor member an electrostatic charge initially of given polarity induced by said relative movement of said conductive members of said exciter, a condenser having a capacity which is greater than the maximum capacity which may exist between a selected one of said inductor members and the corresponding conveyor member, and means effective concomitantly with the movement of said selected inductor member and the corresponding conveyor member relative to each other for connecting said corresponding conveyor member and said condenser in a circuit connected to said other terminal which without said condenser normally carries charges in a given direction relative to said corresponding conveyor member when said exciter delivers a charge of given polarity to said inductor member of said generator, whereby said condenser is effective to reverse the direction of said charge conveyed in said circuit thereby to effect reversal of the polarity of said generator relative to said other terminal.

5. Electrostatic apparatus as defined in claim 1 which comprises a resistance connected across said condenser capable of passing a leakage current to limit the charge of said condenser.

6. Electrostatic apparatus as defined in claim 1 which comprises means connected to a terminal of said condenser for passing a discharge current therethrough from said condenser to limit the potential across said condenser.

7. Electrostatic apparatus as defined in claim 6 in which said limiting means comprises a spark gap connected to a terminal of said condenser for discharge therethrough under a given potential thereacross.

8. Electrostatic apparatus as defined in claim 1 which comprises an ionized gas discharge device connected between a terminal of said condenser and a member having a predetermined potential for discharge of said condenser to said member through said device under a given potential of said condenser terminal.

9. Electrostatic apparatus as defined in claim 1 which comprises a luminescent discharge tube connected in series with said condenser in said circuit.

10. Electrostatic apparatus as defined in claim 9 in which said luminescent discharge tube has electrodes which are substantially the same to provide substantially equal luminous sheaths at said electrodes whichever is the cathode.

11. Electrostatic apparatus as defined in claim 1 which comprises means connected to said condenser and operable to establish connection of said condenser in said circuit respectively in charged condition to be effective to reverse polarity and in discharge condition to be ineffective to reverse polarity.

12. Electrostatic apparatus as defined in claim 11 which comprises a switch connected in a short circuiting connection across the terminals of said condenser and operable to close and open said short circuiting connection.

13. Electrostatic apparatus as defined in claim 12 in which said switch is biased to closed short circuiting position.

14. Electrostatic apparatus as defined in claim 1 which comprises a circuit connected across the terminals of said condenser in parallel therewith, and means in said circuit for establishing across said condenser terminals a potential in a predetermined direction.

15. Electrostatic apparatus as defined in claim 14 in which said means in said parallel circuit comprises a unidirectional flow device connected in said parallel circuit to predetermine the polarity of the charge upon said condenser.

16. Electrostatic apparatus as defined in claim 15 in which said unidrectional flow device is a diode.

17. Electrostatic apparatus comprising an electrostatic generator having a conductive inductor member and a conductive conveyor member, said members being supported for movement one relative to the other into and out of inductive relation to each other, a terminal of said electrostatic generator, charge conducting means connected to said terminal and connectible to said conveyor member at a predetermined point in the relative movement of said conveyor and inductor members for conducting to said terminal electrostatic charges induced upon said conveyor by said inductor member in said relative movement of said conveyor and inductor members, means connected to said inductor member for delivering thereto exciting electrostatic charges initially to determine a given polarity of said inductor member and thereby of the charge delivered to said terminal, a member having a predetermined polarity, a condenser, charge transfer means connectible to said conveyor at a point in the relative movement of said conveyor and inductor members spaced from said predetermined point and connected in a circuit of said electrostatic apparatus connected between said charge transfer means and said member having said predetermined polarity, said condenser being connected in said circuit in series with and between said charge transfer means and said member having said predetermined polarity, whereby charges may be exchanged between said conveyor and said condenser through said circuit to vary the charge conveyed by said conveyor member to said terminal, and means connecting said conveyor member when at said predetermined point in said relative movement of said conveyor and inductor members to said means for delivery exciting electrostatic charges to said inductor member to vary the exciting charge delivered by said exciting means to said inductor member to change the polarity of said inductor member and concomitantly the polarity of said terminal relative to said predetermined polarity.

18. Electrostatic apparatus comprising an electrostatic generator having a conductive inductor member and a conductive conveyor member, said members being supported for movement one relative to the other into and out of inductive relation to each other, a terminal of said electrostatic generator, charge conducting means connected to said terminal and connectible to said conveyor member at a predetermined point in the relative movement of said conveyor and inductor members for conducting to said terminal electrostatic charges induced upon said conveyor by said inductor member in said relative movement of said conveyor and inductor members, an exciter having a conductive inductor member and a conductive conveyor member, said exciter members being supported for movement one relative to the other into and out of inductive relation to each other, exciter charge conducting means connected to said inductor member of said generator and connectible to said exciter conveyor member at a given point in the relative movement of said exciter members for conducting to said inductor member of said generator electrostatic charges initially of a given polarity induced by said relative movement of said exciter inductor and conveyor members initially to determine the polarity of said generator inductor member and of the charges delivered to said terminal, a condenser, charge transfer elements respectively connectible to said conveyor members at points in the relative movement of said conveyor members and the corresponding inductor members that are spaced respectively from said predetermined and given points in the relative movement of said generator and exciter conveyor and inductor members, said charge transfer elements being electrically connected together in a circuit, said condenser being connected in said circuit in series with and between said two charge transfer elements, whereby charges may be exchanged through said circuit between said condenser and the respective conveyor members connectible to said respective charge transfer elements to change the direction of said exchange and to change the amount of said electrostatic charges which are conducted to said terminal.

19. Electrostatic apparatus as defined in claim 18 in which one of the terminals of said condenser is connected to ground.

ROGER MOREL.

References Cited in the file of this patent

UNITED STATES PATENTS

| Number | Name | Date |
|---|---|---|
| 2,522,106 | Felici | Sept. 10, 1950 |
| 2,590,168 | Felici | Mar. 25, 1952 |